(12) United States Patent
Huang (10) Patent No.: US 12,113,570 B2
(45) Date of Patent: Oct. 8, 2024

(54) ULTRA-WIDEBAND NON-REFLECTIVE FRONT-END IN MULTIBAND SYSTEM

(71) Applicant: Telefonaktiebolaget LM Ericsson (publ), Stockholm (SE)

(72) Inventor: Xue Huang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 18/019,432

(22) PCT Filed: Aug. 5, 2020

(86) PCT No.: PCT/IB2020/057375
§ 371 (c)(1),
(2) Date: Feb. 2, 2023

(87) PCT Pub. No.: WO2022/029468
PCT Pub. Date: Feb. 10, 2022

(65) Prior Publication Data
US 2023/0327703 A1 Oct. 12, 2023

(51) Int. Cl.
*H04B 1/7163* (2011.01)
*H04B 1/18* (2006.01)

(52) U.S. Cl.
CPC ........... *H04B 1/71632* (2013.01); *H04B 1/18* (2013.01)

(58) Field of Classification Search
CPC .............................. H04B 1/71632; H04B 1/18
See application file for complete search history.

(56) References Cited

U.S. PATENT DOCUMENTS

| | | | |
|---|---|---|---|
| 9,692,458 B2 * | 6/2017 | Talty | H04B 1/001 |
| 11,515,608 B2 * | 11/2022 | Pehlke | H01Q 21/30 |
| 2011/0117862 A1 | 5/2011 | Bagger et al. | |
| 2017/0310369 A1 * | 10/2017 | Oliver | H04B 7/0617 |
| 2021/0051559 A1 * | 2/2021 | Edge | H04W 36/32 |
| 2021/0083702 A1 * | 3/2021 | Jian | H04B 1/0057 |

FOREIGN PATENT DOCUMENTS

| | | |
|---|---|---|
| EP | 3251217 A1 | 12/2017 |
| WO | 2016120672 A1 | 8/2016 |

OTHER PUBLICATIONS

International Search Report and Written Opinion of the International Searching Authority for PCT International Application No. PCT/IB2020/057375 dated Apr. 22, 2021.

* cited by examiner

*Primary Examiner* — Jean B Corrielus
(74) *Attorney, Agent, or Firm* — Sage Patent Group (57) ABSTRACT

A network node operating in a communication network can divide a wideband signal into a plurality of sub-bands using a wideband multiplexer. The network node can further pass a portion of a sub-band of the plurality of sub-bands through a wideband circulator of the network node and a second multiplexer to an antenna or processing circuitry.

19 Claims, 7 Drawing Sheets

ULTRA-WIDEBAND NON-REFLECTIVE FRONT-END IN MULTIBAND SYSTEM

CROSS REFERENCE TO RELATED APPLICATION

This application is a 35 U.S.C. § 371 national stage application of PCT International Application No. PCT/IB2020/057375 filed on Aug. 5, 2020, the disclosure and content of which is incorporated by reference herein in its entirety.

TECHNICAL FIELD

The present disclosure is related to wireless communication systems and more particularly to an ultra-wideband non-reflective front-end in a multiband system.

BACKGROUND

Figure 1:
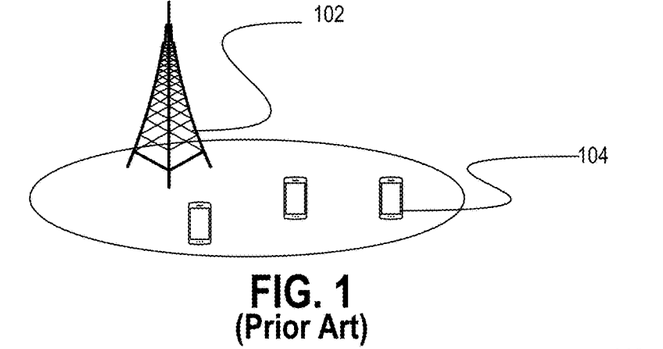
FIG. 1 is a schematic diagram illustrating an example of a $5^{th}$ generation ("5G") network, also referred to as a new radio ("NR") network.

FIG. 1 illustrates an example of a $5^{th}$ Generation ("5G") network including a 5G base station ("gNB") 102 and multiple communication devices 104 (also referred to as user equipment ("UE")).

Figure 2:
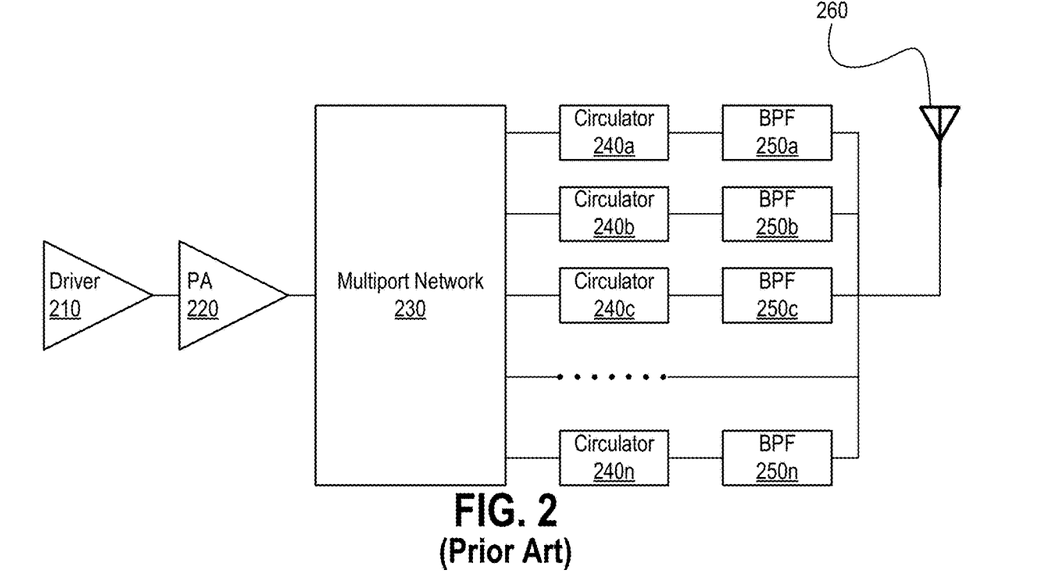
FIG. 2 is a block diagram illustrating an example of a wide multiband transmitter system.
Figure 3:
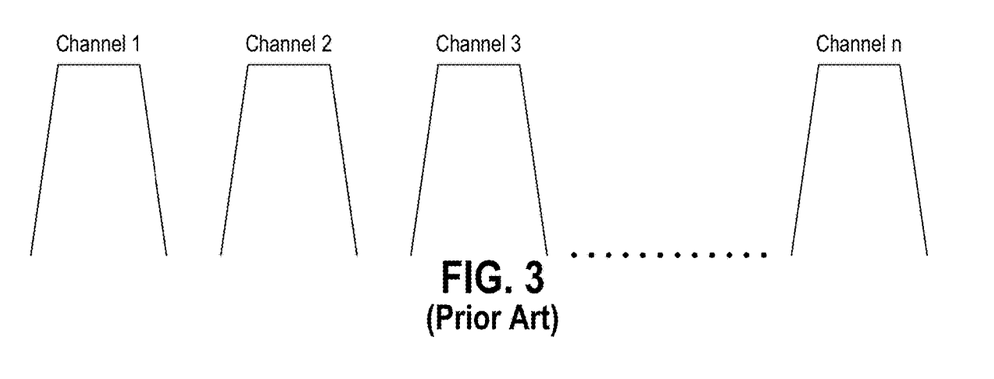
FIG. 3 is a schematic diagram illustrating an example of channels provided by the transmitter system in FIG. 2.

FIG. 2 illustrates an example of a wideband front-end for a transmitter system. A driver 210 feeds a power amplifier ("PA") 220, which inputs a wideband signal into a multiport network that divides the wideband signal into n number of portions. Each portion passes through a circulator 240a-n and a corresponding band pass filter ("BPF") 250a-n to produce the n channels illustrated in FIG. 3. Due to the system being a multiband system, the harmonic and intermodulation products can be very wide in spectrum. The in-band signals will be transmitted to the antenna 260 and the out of band signals will be reflected back by the BPFs 250a-n to the PA 220.

SUMMARY

According to some embodiments, a method of operating a network node in a communications network is provided. The method includes dividing a wideband signal into a plurality of sub-bands using a wideband multiplexer of the network node. The method further includes passing a portion of a sub-band of the plurality of sub-bands through a wideband circulator of the network node and a second multiplexer to an antenna or processing circuitry of the network node.

According to other embodiments, a network node, computer program, and/or computer program product is provided for performing the above method.

In various embodiments described herein, a wideband multiplexer and wideband circulator produce a non-reflective front-end. In some embodiments, the wideband multiplexer includes cascading low pass filters ("LPFs") and high pass filters ("HPFs") that can be matched. The wideband multiplexer can divide a wideband signal into sub-bands with a relative bandwidth that exceeds 100% of the wideband signal. The insertion loss of the wideband multiplexer can be low and the working band can cover from DC to very high frequencies.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 4:
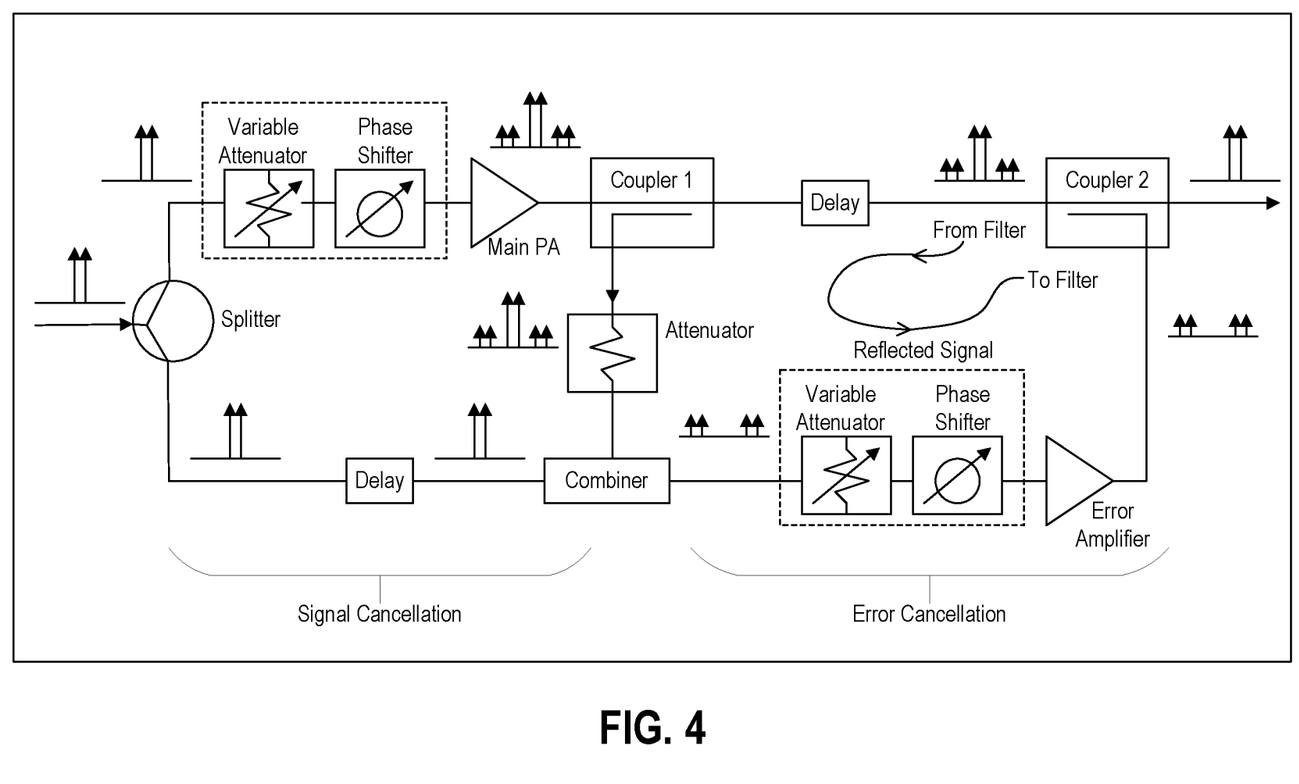
FIG. 4 is a circuit diagram illustrating an example of an ultra-wideband feedforward circuit.

FIG. 4 illustrates an example of a ultra-wideband feedforward circuit. In this example, the reflected signals can be amplified by the error amplifier again and again and this will cause a reliability problem with the system, or reduce the performance of the front-end system. Therefore, a non-reflective front-end can be used to improve performance. A non-reflective front-end being used with a transmitter can cause all in-band signal to be transmitted to an antenna port and the out of band signals to be absorbed by the front-end itself.

Figure 5:
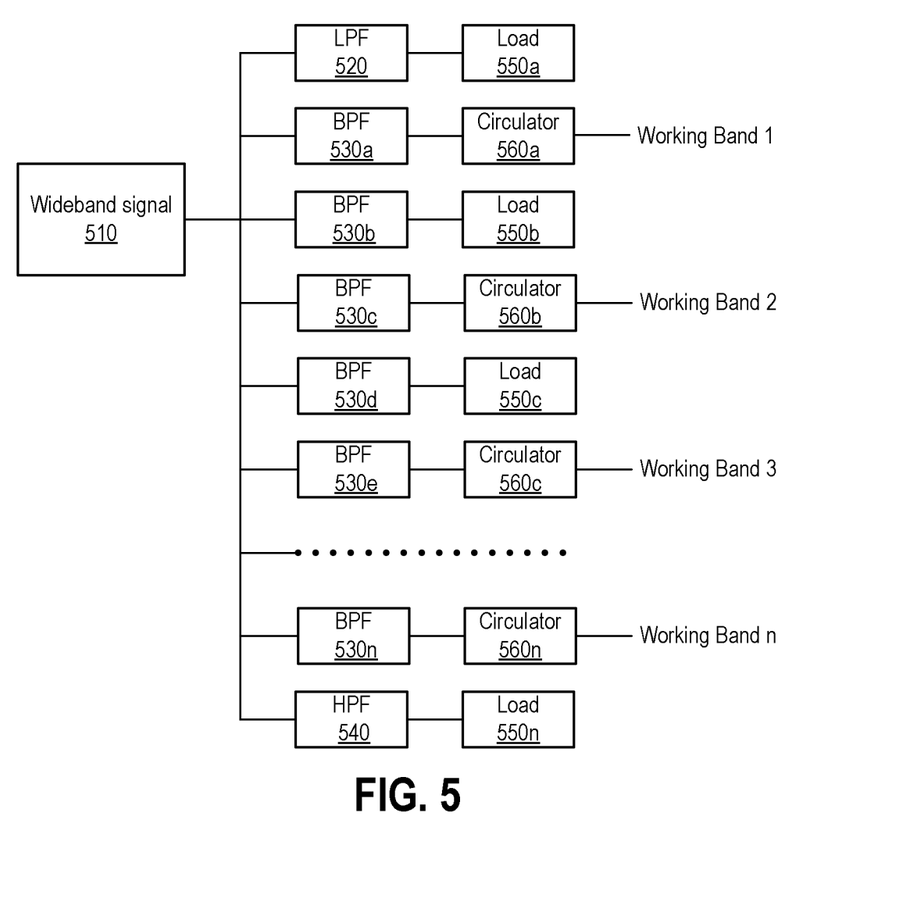
FIG. 5 is a block diagram illustrating an example of a non-reflective front-end having band pass filters ("BPFs") that consist of a low pass filter ("LPF") and a high pass filter ("HPF")

FIG. 5 illustrates an example of connecting bandpass, lowpass and high pass filters together. A wideband signal 510 is divided and provided to a low pass filter ("LPF") 520, band pass filters ("BPFs") 530a-n, and a high pass filter ("HPF") 540. Each of the filters associated with desired channels (e.g., working bands 1-n) are coupled to a corresponding circulator 560a-n while each of the undesired channels are connected with a load. This can result in a multiplexer only working in the wanted channel while no signal is reflected to back to a PA.

However, matching the LPF 520, BPFs 530*a-c*, and HPF 540 can be difficult. A BPF will introduce a large reactive component in the terminating impedance seen by the LPF/HPF in the pass band of the LPF/HPF. The LPF/HPF will also introduce a large reactive component to the termination seen by the BPF in the pass band of the BPF. These reactive components can make matching between BPF, LPF, and HPF difficult.

It can also be difficult to determine if the relative bandwidth of a BPF is more than 100%.

Various embodiments described herein include a multiplexer made of cascading LPFs and HPFs and wideband circulators. The multiplexer can split a whole wideband signal into many sub-bands. The bandwidth of the sub-bands can be over one octave. The working sub-bands are each connected with a wideband circulator and the unused sub-bands are each connected with a wideband load. The BPF can be connected in parallel with the wideband circulator. The signals between the working bands can be reflected by the BPF and absorbed by the wideband circulators. If all the working bands are within one octave, just one circulator is needed. The unused sub-bands can be very wide (more than one octave) but the working sub-bands will not be more than one octave due to the limitation of the circulator.

Figure 9:
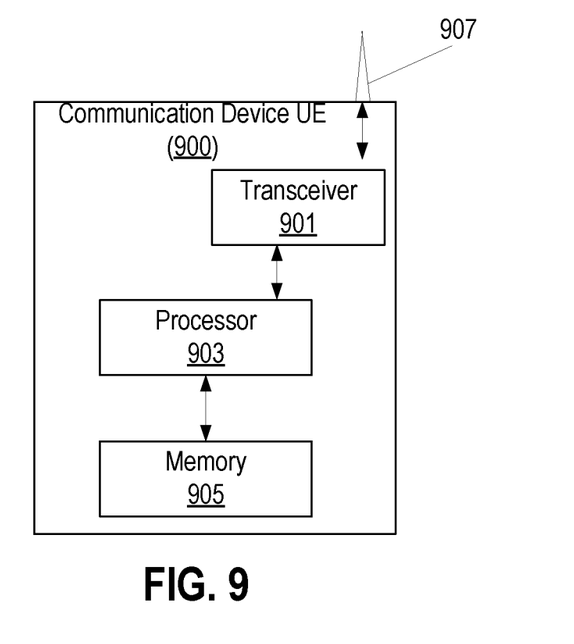
FIG. 9 is a block diagram illustrating an example of a communication device in accordance with some embodiments.

FIG. 9 is a block diagram illustrating elements of a communication device 900 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device 900 may include an antenna 907, and transceiver circuitry 901 (also referred to as a transceiver) including a transmitter and a receiver configured to provide uplink and downlink radio communications with a base station(s) (also referred to as a RAN node) of a radio access network. Communication device 900 may also include processing circuitry 903 (also referred to as a processor) coupled to the transceiver circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that separate memory circuitry is not required. Communication device 900 may also include an interface (such as a user interface) coupled with processing circuitry 903, and/or communication device UE may be incorporated in a vehicle.

As discussed herein, operations of communication device 900 may be performed by processing circuitry 903 and/or transceiver circuitry 901. For example, processing circuitry 903 may control transceiver circuitry 901 to transmit communications through transceiver circuitry 901 over a radio interface to a radio access network node (also referred to as a base station) and/or to receive communications through transceiver circuitry 901 from a RAN node over a radio interface. Moreover, modules may be stored in memory circuitry 905, and these modules may provide instructions so that when instructions of a module are executed by processing circuitry 903, processing circuitry 903 performs respective operations.

Figure 10:
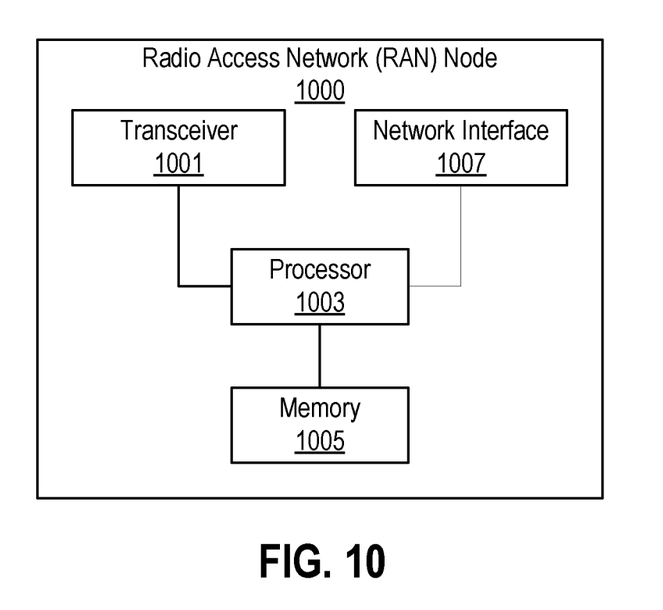
FIG. 10 is a block diagram illustrating an example of a radio access network ("RAN") node in accordance with some embodiments.

FIG. 10 is a block diagram illustrating elements of a radio access network ("RAN") node 1000 (also referred to as a network node, base station, eNodeB/eNB, gNodeB/gNB, etc.) of a Radio Access Network (RAN) configured to provide cellular communication according to embodiments of inventive concepts. As shown, the RAN node 1000 may include transceiver circuitry 1001 (also referred to as a transceiver) including a transmitter and a receiver configured to provide uplink and downlink radio communications with mobile terminals. The RAN node 1000 may include network interface circuitry 1007 (also referred to as a network interface) configured to provide communications with other nodes (e.g., with other base stations) of the RAN and/or core network CN. The RAN node 1000 may also include processing circuitry 1003 (also referred to as a processor) coupled to the transceiver circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the RAN node 1000 may be performed by processing circuitry 1003, network interface 1007, and/or transceiver 1001. For example, processing circuitry 1003 may control transceiver 1001 to transmit downlink communications through transceiver 1001 over a radio interface to one or more mobile terminals UEs and/or to receive uplink communications through transceiver 1001 from one or more mobile terminals UEs over a radio interface. Similarly, processing circuitry 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to network nodes).

Figure 6:
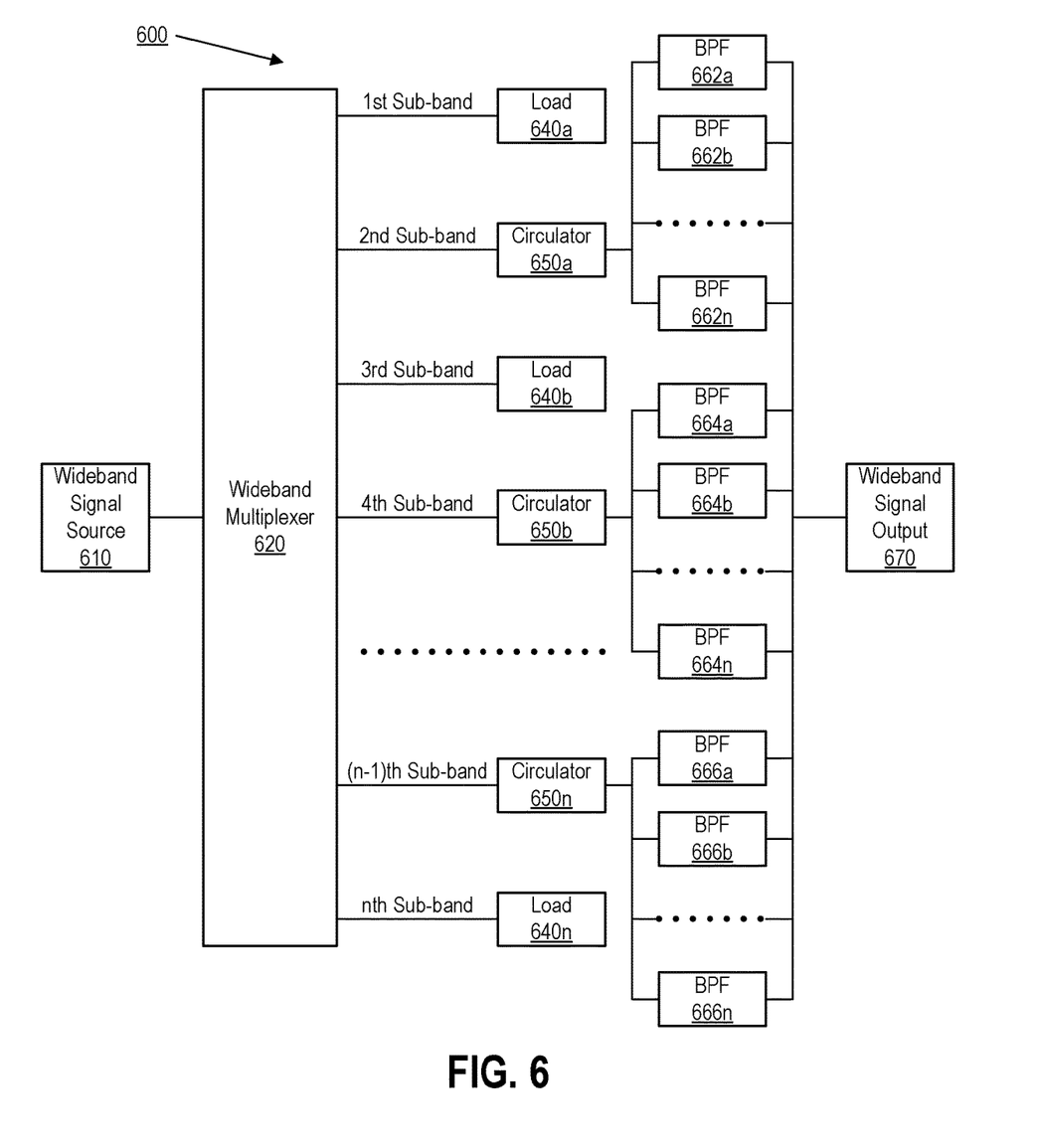
FIG. 6 is a block diagram illustrating an example of a wideband front-end in accordance with some embodiments

FIG. 6 illustrates an example of a wideband front-end with a wideband multiplexer 620. The wideband multiplexer 620 can receive the wideband signal from the wideband signal source 610 and divide the wideband signal into n number of sub-bands. Undesired sub-bands can be passed to loads 640*a-n*. Desired sub-bands can be passed to corresponding a first port of circulators 650*a-n*. A second port of each of the circulators 650*a-n* can be coupled to a unique set of BPFs 662-*an*, 664*a-n*, and 666*a-n* an output of which can be provided to wideband signal output 670.

In some embodiments, the wideband front-end is part of a transmitter. The wideband signal source 610 can include a driver and power amplifier for generating a wideband signal. The wideband signal output 670 can include an antenna for transmitting desired portions of the sub-bands.

In additional or alternative embodiments, the wideband front-end is part of a receiver. The wideband signal source 610 can include an antenna and the wideband signal output 670 can include processing circuitry for processing the desired portions of the sub-bands.

Figure 7:
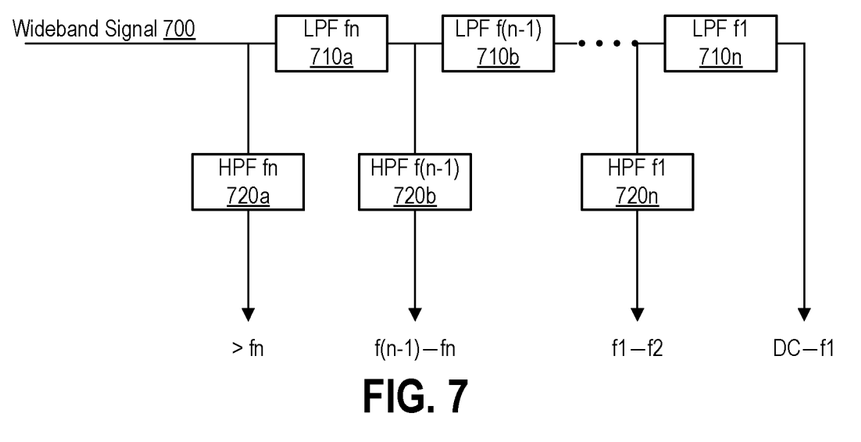
FIG. 7 is a block diagram illustrating an example of how lowpass and high pass filters are cascaded in accordance with some embodiments.

FIG. 7 illustrates an example of circuitry for implementing a wideband multiplexer (e.g., wideband multiplexer 620 in FIG. 6) using cascading LPFs 710*a-n* and HPFs 720*a-n*. δA wideband signal 700, having a frequency range from DC to fn, can be input to both LPF 710*a* and HPF 720*a*. HPF 720*a* can have a cut-off frequency of fn such that any portion of the wideband signal 700 with a frequency higher than fn is output by the HPF 720*a*. The LPF 710 can have a cut-off frequency of fn such than any portion of the wideband signal 700 with a frequency less than fn is output by the LPF 710*a*.

The output of the LPF 710*a* can be provided (cascaded) as input to LPF 710*b* and HPF 720*b*. HPF 720*b* can have a cut-off frequency of f(n−1) such that any portion of the output of LPF 710*a* that is higher than f(n−1) is output by the HPF 720*b*. Therefore, HPF 720*b* outputs a portion of the wideband signal 700 with frequencies between f(n−1) and fn. LPF 710*b* can have a cut-off frequency of f(n−1) such that any portion of the output of LPF 710*a* that is less than f(n−1) is output by the LPF 710*b*.

The output of the LPF 710*b* can be passed (cascaded) through a series of LPFs and HPFs and a portion of the output of the LPF 710*b* (e.g., a portion having a frequency less than f2) can be provided to LPF 710*n* and HPF 720*n*. HPF 720*n* can have a cut-off frequency of f1 such that any portion of the remaining signal input into HPF 720*n* that is higher than f(1) is output by the HPF 720*n*. Therefore, HPF 720*n* outputs a portion of the wideband signal 700 with frequencies between f1 and f2. LPF 710*n* can have a cut-off frequency of f1 such that any portion of the remaining signal input into LPF 710*n* less than f1 is output by the LPF 710*n*. Therefore, LPF 710*n* output a portion of the wideband signal 700 with frequencies from 0 (direct current) to f1.

Figure 8:
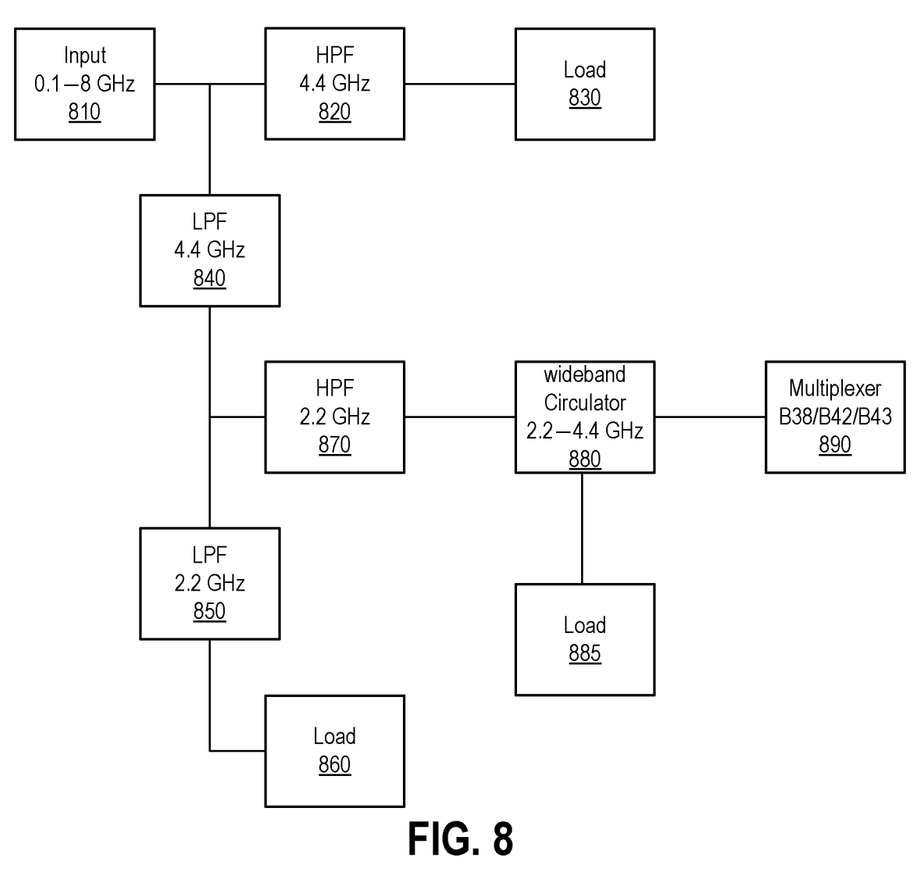
FIG. 8 is a block diagram illustrating an example of a non-reflective cascaded front-end in accordance with some embodiments.

FIG. 8 illustrates an example of a front-end system handling a wideband signal having frequencies from 0.1 to 8 GHz, where a desired channel is from 2.2 to 4.4 GHz. A wideband signal 810 is provided to a HPF 820 and a LPF 840. The HPF 820 has a 4.4 GHz cut-off frequency and passes a portion of the wideband signal from 4.4 to 8 GHz (an undesired channel) to a load 830. The LPF 840 has a 4.4 GHz cut-off frequency and passes a portion of the wideband signal from 0.1 to 4.4. GHz to LPF 850 and HPF 870. The LPF 850 has a cut-off frequency of 2.2 GHz and passes a portion of the wideband signal from 0.1 to 2.2 GHz (an undesired channel) to a load 860. HPF 870 has a cut-off frequency of 2.2 GHz and passes a portion of the wideband signal from 2.2 to 4.4 GHz (a desired channel) to a first port of a wideband circulator 880. The wideband circulator can be configured to handle a portion of a wideband signal including frequencies from 2.2 to 4.4 GHz and pass the portion to multiplexer 890. The multiplexer 890 can include a series of BPFs and any reflected portion of the signal provided to the multiplexer 890 is provided to a second port of the wideband circulator 880, which can pass the portion to a third port of the wideband circulator that is coupled to load 885. A non-reflected (desired) portion of the signal provided to the multiplexer 890 can be provided as output of the front-end system to an antenna or processing circuitry.

Figure 11:
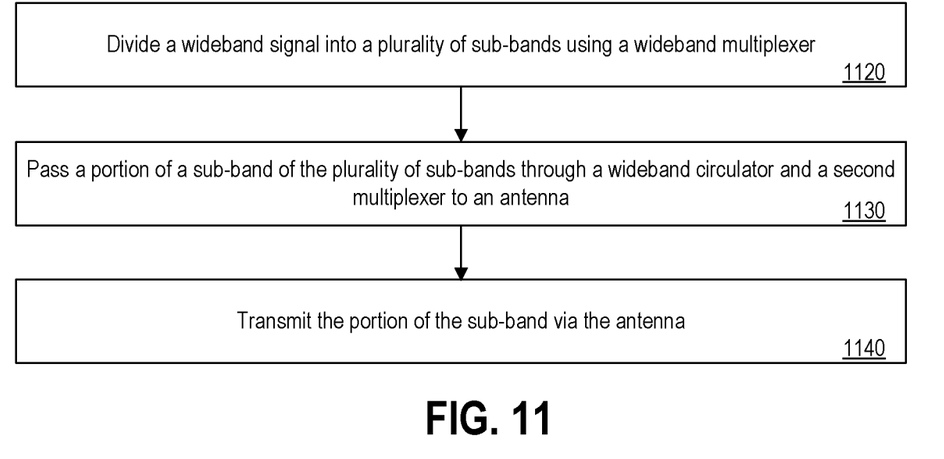
FIGS. 11-12 are flow charts illustrating examples of processes performed by a network node having an ultra-wideband non-reflective front-end in accordance with some embodiments.
Figure 12:
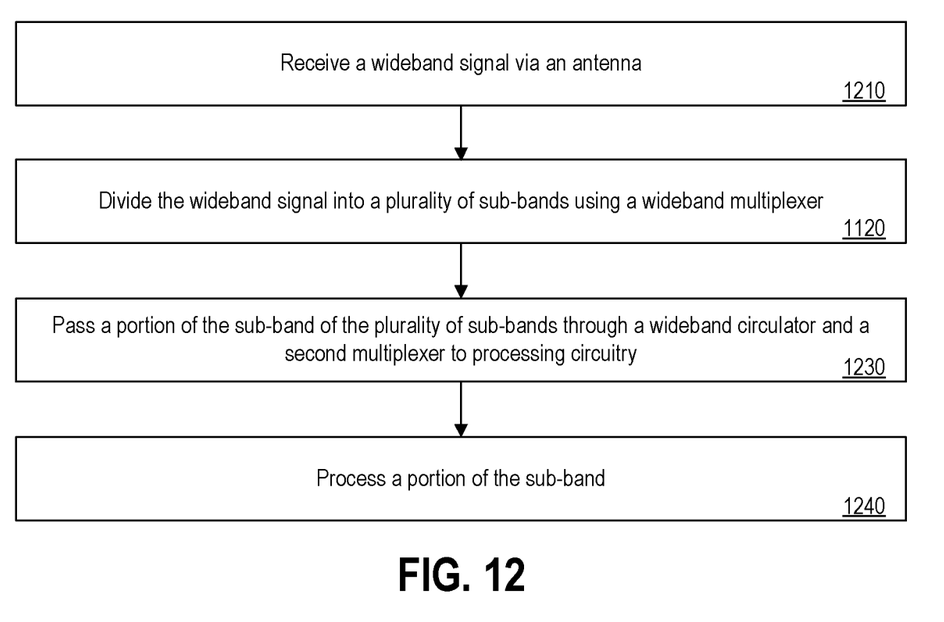

FIGS. 11-12 illustrates examples of processes performed by a network node (e.g., communication device 900 or RAN node 1000). FIGS. 11-12 will be described below as being performed by front-end 600 (implemented using the structure of the block diagram of FIG. 6).

FIG. 11 illustrates an example of operations performed by a front-end 600 implemented in a transmitter.

At block 1120, wideband multiplexer 620 divides a wideband signal into a plurality of sub-bands. In some embodiments, the wideband multiplexer 620 can include a series of cascading HPFs and LPFs (as in FIG. 7) that divide the wideband signal into the plurality of sub-bands. In additional or alternative embodiments, dividing the wideband signal into the plurality of sub-bands includes generating a first sub-band of the plurality of sub-bands by passing the wideband signal through a first HPF; generating a second sub-band of the plurality of sub-bands by passing the wideband signal through a first LPF followed by a second HPF; and generating a third sub-band of the plurality of sub-bands by passing the wideband signal through a first LPF followed by a second LPF followed by a third HPF.

At block 1130, circulator 650*a*-*n* passes a portion of a sub-band of the plurality of sub-bands from a first port to an antenna (e.g., antenna 907 of FIG. 9 or transceiver 1001 of FIG. 10) via a second port and through a second multiplexer (e.g., BPFs 662*a*-*n* in FIG. 6 or multiplexer 890 in FIG. 8). The portion may be a first portion of the sub-band. In some embodiments, passing the portion of the sub-band from the first port of the wideband circulator 650*a*-*n* to the antenna via the second port of the wideband circulator 650*a*-*n* includes passing the sub-band from the first port of the wideband circulator 650*a*-*n* to the second port of the wideband circulator 650*a*-*n* and responsive to passing the sub-band from the first port of the wideband circulator 650*a*-*n* to the second port of the wideband circulator, providing the sub-band to the second multiplexer Responsive to providing the sub-band to the second multiplexer, the second multiplexer can divide the sub-band into the first portion and a second portion.

In additional or alternative embodiments, responsive to dividing the sub-band into the first portion of the sub-band and the second portion of the sub-band, the second multiplexer can reflect the second portion of the sub-band to the second port of the wideband circulator 650*a*-*n*. Responsive to the second portion of the sub-band being reflected to the second port of the wideband circulator 650*a*-*n*, the wideband circulator 650*a*-*n* can pass the second portion of the sub-band from the second port to a load via a third port of the wideband circulator 650*a*-*n*.

In additional or alternative embodiments, responsive to dividing the sub-band into the first portion of the sub-band, the second multiplexer can pass the first portion of the sub-band to the antenna.

At block 1140, the antenna transmits the portion of the sub-band via the antenna.

FIG. 12 illustrates an example of operations performed by a front-end 600 implemented in a receiver. At block 1210, an antenna (e.g., antenna 907 of FIG. 9 or transceiver 1001 of FIG. 10) receives a wideband signal. Block 1120 is the same as in FIG. 11. The wideband multiplexer 620 divides the wideband signal into a plurality of sub-bands. At block 1230, the circulator 650*a*-*n* passes a portion of a sub-band of the plurality of sub-bands from a first port to processing circuitry (e.g., processing circuitry 903 of FIG. 9 or processing circuitry 1003 of FIG. 10) via a second port and through a second multiplexer (e.g., a narrowband multiplexer). In some embodiments similar operations to those described in block 1130 of FIG. 11 may be performed at block 1230. At block 1240, the processing circuitry processes the portion of the sub-band.

Various operations of FIGS. 11-12 may be optional with respect to some embodiments of network nodes and related methods. In some methods, for example, operations of block 1140 of FIG. 11 and blocks 1210 and 1240 of FIG. 12 may be optional. Additionally, the various operations of FIGS. 11-12 can be combined or arranged in any appropriate order and be within the intended scope of this disclosure.

Example Embodiments are included below. The Embodiments described below can be included, omitted, combined, or arranged in any appropriate order or combination and be within the intended scope of this disclosure.

Embodiment 1. A method of operating a network node in a communications network, the method comprising:
  dividing (1120) a wideband signal into a plurality of sub-bands using a wideband multiplexer of the network node; and
  passing (1130, 1230) a portion of a sub-band of the plurality of sub-bands through a wideband circulator of the network node and a second multiplexer of the network node to an antenna or processing circuitry of the network node.

Embodiment 2. The method of Embodiment 1, wherein the wideband multiplexer comprises a series of cascading high pass filters, HPFs, and low pass filters, LPFs, that divide the wideband signal into the plurality of sub-bands.

Embodiment 3. The method of Embodiment 2, wherein dividing the wideband signal comprises:
  generating a first sub-band of the plurality of sub-bands by passing the wideband signal through a first HPF;
  generating a second sub-band of the plurality of sub-bands by passing the wideband signal through a first LPF followed by a second HPF; and generating a third sub-band of the plurality of sub-bands by passing the wideband signal through a first LPF followed by a second LPF followed by a third HPF.

Embodiment 4. The method of any of Embodiments 1-3, wherein the portion of the sub-band is a first portion of the sub-band,
  wherein passing the portion of the sub-band to the antenna or the processing circuitry comprises:
    passing the sub-band from a first port of the wideband circulator to a second port of the wideband circulator;
    responsive to passing the sub-band from the first port of the wideband circulator to the second port of the wideband circulator, providing the sub-band to the second multiplexer; and
    responsive to providing the sub-band to the second multiplexer, dividing the sub-band into the first portion and a second portion using the second multiplexer.

Embodiment 5. The method of Embodiment 4, wherein passing the first portion of the sub-band to the antenna or the processing circuitry further comprises:
  responsive to dividing the sub-band into the first portion of the sub-band and the second portion of the sub-band, reflecting the second portion of the sub-band to the second port of the wideband circulator; and
  responsive to reflecting the second portion of the sub-band to the second port of the wideband circulator, passing the second portion of the sub-band from the second port to a load via a third port of the wideband circulator.

Embodiment 6. The method of any of Embodiments 4-5, wherein passing the first portion of the sub-band to the antenna or the processing circuitry further comprises:
  responsive to dividing the sub-band into the first portion of the sub-band, passing the first portion of the sub-band to the antenna or the processing circuitry.

Embodiment 7. The method of any of Embodiments 1-6, wherein the network node comprises a transmitter, and
  wherein the portion of the sub-band of the plurality of sub-bands is passed to the antenna of the network node, the method further comprising:
    transmitting (1140) the portion of the sub-band via the antenna.

Embodiment 8. The method of any of Embodiments 1-7, wherein the network node comprises a receiver, and
  wherein the portion of the sub-band of the plurality of sub-bands is passed to the processing circuitry of the network node,
  the method further comprising:
    receiving (1210), prior to dividing the wideband signal, the wideband signal via the antenna of the receiver Embodiment 9. The method of any of Embodiments 1-8, wherein the network node comprises a radio access network, RAN, node, and
  wherein the communications network comprises a new radio, NR, network.

Embodiment 10. The method of any of Embodiments 1-8, wherein the network node comprises a communication device and
  wherein the communications network comprises a new radio, NR, network.

Embodiment 11. A network node (900, 1000) operating in a communications network, the network node comprising:
  a wideband multiplexer configured to divide (1120) a wideband signal into a plurality of sub-bands;
  a wideband circulator coupled to an output of the wideband multiplexer and including a first port and a second port, the wideband circulator configured to pass (1130, 1230) a sub-band of the plurality of sub-bands from the first port to a second port; and
  a second multiplexer coupled to the second port of the wideband circulator and configured to divide the sub-band into a first portion and a second portion.

Embodiment 12. The network node of Embodiment 11, wherein the wideband multiplexer comprises a series of cascading high pass filters, HPFs, and low pass filters, LPFs, configured to divide the wideband signal into the plurality of sub-bands.

Embodiment 13. The network node of Embodiment 12, wherein the series of cascading HPFs and LPFs comprises:
  a first HPF configured to receive the wideband signal and generate a first sub-band of the plurality of sub-bands;
  a first LPF configured to receive the wideband signal and generate a first temporary sub-band;
  a second HPF configured to receive the first temporary sub-band and generate a second sub-band of the plurality of sub-bands;
  a second LPF configured to receive the first temporary sub-ban and generate a second temporary sub-band; and
  a third HPF configured to receive the second temporary sub-band and generate a third sub-band of the plurality of sub-bands.

Embodiment 14. The network node of any of Embodiments 11-13, wherein the second multiplexer is a narrowband multiplexer comprising a plurality of band pass filters configured to divide the sub-band into the first portion and the second portion.

Embodiment 15. The network node of Embodiment 14, wherein the second multiplexer is further configured to reflect the second portion of the sub-band to the second port of the wideband circulator, and
  wherein the wideband circulator further includes a third port and is further configured to pass the second portion of the sub-band to a load via the third port.

Embodiment 16. The network node of any of Embodiments 14-15, wherein an antenna or processing circuitry is coupled to the second port of the wideband circulator via the second multiplexer, and
  wherein the second multiplexer is further configured to pass the first portion of the sub-band to the antenna or the processing circuitry.

Embodiment 17. The network node of any of Embodiments 11-16, wherein the network node comprises a transmitter (901, 1001), the transmitter comprising:
    an antenna coupled to the second multiplexer and configured to transmit (1140) the first portion of the sub-band.

Embodiment 18. The network node of any of Embodiments 11-16, wherein the network node comprises a receiver (901, 1001), the receiver comprising:
    an antenna configured to receive (1210) the wideband signal; and
    processing circuitry coupled to the second multiplexer and configured to process (1240) the first portion of the sub-band.

Embodiment 19. The network node of any of Embodiments 11-18, wherein the network node is a radio access network, RAN, node, and
    wherein the communications network comprises a new radio, NR, network.

Embodiment 20. The network node of any of Embodiments 11-18, wherein the network node is a communication device and
    wherein the communications network comprises a new radio, NR, network.

Embodiment 21. A network node (900, 1000) operating in a communications network to perform operations, the operations comprising:
    dividing (1120) a wideband signal into a plurality of sub-bands using a wideband multiplexer of the network node; and
    passing (1130, 1230) a portion of a sub-band of the plurality of sub-bands through a wideband circulator of the network node and a second multiplexer of the network node to an antenna or processing circuitry of the network node.

Embodiment 22. A network node (900, 1000) operating in a communication network and adapted to perform according to any of Embodiments 1-10.

Embodiment 23. A computer program comprising program code to be executed by processing circuitry (903, 1003) of a network node (900, 1000) operating in a communications network, whereby execution of the program code causes the network node to perform operations, the operations comprising:
    dividing (1210) a wideband signal into a plurality of sub-bands using a wideband multiplexer of the network node; and
    passing (1220) a portion of a sub-band of the plurality of sub-bands through a wideband circulator of the network node and a second multiplexer to an antenna or processing circuitry of the network node.

Embodiment 24. A computer program comprising program code to be executed by processing circuitry (903, 1003) of a network node (900, 1000) operating in a communications network, whereby execution of the program code causes the network node to perform operations according to any of Embodiments 1-10

Embodiment 25. A computer program product comprising a non-transitory storage medium including program code to be executed by processing circuitry (903, 1003) of a network node (900, 1000) operating in a communications network, whereby execution of the program code causes the network node to perform operations, the operations comprising:
    dividing (1120) a wideband signal into a plurality of sub-bands using a wideband multiplexer of the network node;
    passing (1130, 1230) a portion of a sub-band of the plurality of sub-bands through a wideband circulator of the network node and a second multiplexer to an antenna or processing circuitry of the network node.

Embodiment 26. A computer program product comprising a non-transitory storage medium including program code to be executed by processing circuitry (903, 1003) of a network node (900, 1000) operating in a communications network, whereby execution of the program code causes the network node to perform operations according to any of Embodiments 1-10.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).
    1×RTT CDMA2000 1× Radio Transmission Technology
    3GPP 3rd Generation Partnership Project
    5G 5th Generation
    ABS Almost Blank Subframe ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a network node in a communications network, the method comprising:
dividing a wideband signal into a plurality of sub-bands using a wideband multiplexer of the network node, wherein the wideband multiplexer comprises a series of cascading high pass filters, HPFs, and low pass filters, LPFs, that divide the wideband signal into the plurality of sub-bands; and
passing a portion of a sub-band of the plurality of sub-bands through a wideband circulator of the network node and a second multiplexer of the network node to an antenna or processing circuitry of the network node.

2. The method of claim 1, wherein dividing the wideband signal comprises:
generating a first sub-band of the plurality of sub-bands by passing the wideband signal through a first HPF;
generating a second sub-band of the plurality of sub-bands by passing the wideband signal through a first LPF followed by a second HPF; and generating a third sub-band of the plurality of sub-bands by passing the wideband signal through the first LPF followed by a second LPF followed by a third HPF.

3. The method of claim 1, wherein the portion of the sub-band is a first portion of the sub-band,
wherein passing the portion of the sub-band to the antenna or the processing circuitry comprises:
passing the sub-band from a first port of the wideband circulator to a second port of the wideband circulator;
responsive to passing the sub-band from the first port of the wideband circulator to the second port of the wideband circulator, providing the sub-band to the second multiplexer; and
responsive to providing the sub-band to the second multiplexer, dividing the sub-band into the first portion and a second portion using the second multiplexer.

4. The method of claim 3, wherein passing the first portion of the sub-band to the antenna or the processing circuitry further comprises:
responsive to dividing the sub-band into the first portion of the sub-band and the second portion of the sub-band, reflecting the second portion of the sub-band to the second port of the wideband circulator; and
responsive to reflecting the second portion of the sub-band to the second port of the wideband circulator, passing the second portion of the sub-band from the second port to a load via a third port of the wideband circulator.

5. The method of claim 3, wherein passing the first portion of the sub-band to the antenna or the processing circuitry further comprises:
responsive to dividing the sub-band into the first portion of the sub-band, passing the first portion of the sub-band to the antenna or the processing circuitry.

6. The method of claim 1, wherein the network node comprises a transmitter, and
wherein the portion of the sub-band of the plurality of sub-bands is passed to the antenna of the network node, the method further comprising:
transmitting the portion of the sub-band via the antenna.

7. The method of claim 1, wherein the network node comprises a radio access network, RAN, node, and
wherein the communications network comprises a new radio, NR, network.

8. The method of claim 1, wherein the network node comprises a communication device and
wherein the communications network comprises a new radio, NR, network.

9. A network node operating in a communications network, the network node comprising:
a wideband multiplexer configured to divide a wideband signal into a plurality of sub-bands;
a wideband circulator coupled to an output of the wideband multiplexer and including a first port and a second port, the wideband circulator configured to pass a sub-band of the plurality of sub-bands from the first port to a second port; and
a second multiplexer coupled to the second port of the wideband circulator and configured to divide the sub-band into a first portion and a second portion.

10. The network node of claim 9, wherein the wideband multiplexer comprises a series of cascading high pass filters, HPFs, and low pass filters, LPFs, configured to divide the wideband signal into the plurality of sub-bands.

11. The network node of claim 10, wherein the series of cascading HPFs and LPFs comprises:
a first HPF configured to receive the wideband signal and generate a first sub-band of the plurality of sub-bands;
a first LPF configured to receive the wideband signal and generate a first temporary sub-band;
a second HPF configured to receive the first temporary sub-band and generate a second sub-band of the plurality of sub-bands;
a second LPF configured to receive the first temporary sub-band and generate a second temporary sub-band; and
a third HPF configured to receive the second temporary sub-band and generate a third sub-band of the plurality of sub-bands.

12. The network node of claim 9, wherein the second multiplexer is a narrowband multiplexer and comprises band pass filters configured to divide the sub-band into the first portion and the second portion.

13. The network node of claim 12, wherein the second multiplexer is further configured to reflect the second portion of the sub-band to the second port of the wideband circulator, and
wherein the wideband circulator further includes a third port and is further configured to pass the second portion of the sub-band to a load via the third port.

14. The network node of claim 12, wherein an antenna or processing circuitry is coupled to the second port of the wideband circulator via the second multiplexer, and
wherein the second multiplexer is further configured to pass the first portion of the sub-band to the antenna or the processing circuitry.

15. The network node of claim 9, wherein the network node comprises a transmitter, the transmitter comprising:
an antenna coupled to the second multiplexer and configured to transmit the first portion of the sub-band.

16. The network node of claim 9, wherein the network node comprises a receiver, the receiver comprising:
an antenna configured to receive the wideband signal; and
processing circuitry coupled to the second multiplexer and configured to process the first portion of the sub-band.

17. The network node of claim 9, wherein the network node is a radio access network, RAN, node, and
wherein the communications network comprises a new radio, NR, network.

18. The network node of claim 9, wherein the network node is a communication device and
wherein the communications network comprises a new radio, NR, network.

19. A computer program product comprising a non-transitory storage medium including program code to be executed by processing circuitry of a network node operating in a communications network, whereby execution of the program code causes the network node to perform operations comprising:
dividing a wideband signal into a plurality of sub-bands using a wideband multiplexer of the network node, wherein the wideband multiplexer comprises a series of cascading high pass filters, HPFs, and low pass filters, LPFs, that divide the wideband signal into the plurality of sub-bands; and
passing a portion of a sub-band of the plurality of sub-bands through a wideband circulator of the network node and a second multiplexer of the network node to an antenna or processing circuitry of the network node.

* * * * *